United States Patent
Rose et al.

(10) Patent No.: US 12,317,151 B2
(45) Date of Patent: May 27, 2025

(54) AUTOMATED DEVICE CONTROL SESSION

(71) Applicant: LENOVO (SINGAPORE) PTE. LTD, Singapore (SG)

(72) Inventors: Alden Rose, Morrisville, NC (US); Ali Ent, Morrisville, NC (US); Ghwang Hyun Lim, Morrisville, NC (US); Jeffrey E. Skinner, Morrisville, NC (US); Jung Hwan Hong, Morrisville, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 352 days.

(21) Appl. No.: 17/849,612

(22) Filed: Jun. 25, 2022

(65) Prior Publication Data

US 2023/0421990 A1 Dec. 28, 2023

(51) Int. Cl.
| | |
|---|---|
| *H04B 7/00* | (2006.01) |
| *G01S 5/02* | (2010.01) |
| *H04W 4/02* | (2018.01) |
| *H04W 4/80* | (2018.01) |
| *H04W 76/11* | (2018.01) |

(52) U.S. Cl.
CPC .......... *H04W 4/023* (2013.01); *G01S 5/0284* (2013.01); *G01S 5/0295* (2020.05); *H04W 4/80* (2018.02); *H04W 76/11* (2018.02)

(58) Field of Classification Search
CPC ....... H04W 4/023; H04W 4/80; H04W 76/11; G01S 5/0284; G01S 5/0295; G01S 5/0247; G01S 5/0269; G01S 2205/02
See application file for complete search history.

(56) References Cited

U.S. PATENT DOCUMENTS

| | | | |
|---|---|---|---|
| 9,740,895 B1* | 8/2017 | Liu | G06Q 10/06 |
| 10,267,891 B1* | 4/2019 | Webber | G01S 5/0284 |
| 10,330,783 B1* | 6/2019 | Yuan | H04W 64/006 |
| 10,430,841 B1* | 10/2019 | Shah | G06Q 30/0281 |
| 11,076,259 B1* | 7/2021 | Hovey | H04W 4/40 |
| 11,096,025 B1* | 8/2021 | Thompson | H04W 4/80 |
| 12,089,122 B2* | 9/2024 | Wahl | H04W 4/33 |
| 2010/0007496 A1* | 1/2010 | Orlassino | H04W 4/02 |
| | | | 340/572.1 |
| 2013/0143499 A1* | 6/2013 | Ando | H04W 4/021 |
| | | | 455/41.2 |

(Continued)

OTHER PUBLICATIONS

Dotlic et al., Angle of Arrival Estimation Using Decawave DW1000 Integrated Circuits, IEEE Xplore: Jan. 11, 2018, IEEE 2017 14th Workshop on Positioning, Navigation and Communications (WPNC), Date of Conference: Oct. 25-26, 2017 (6 pages).

(Continued)

*Primary Examiner* — Stephen M D Agosta
(74) *Attorney, Agent, or Firm* — Brian J. Pangrle

(57) ABSTRACT

A method can include receiving by a mobile device, an identifier transmitted wirelessly from a tagged device; accessing proximity information using the identifier and the mobile device; performing a wireless ranging protocol using the mobile device to determine a distance from the mobile device to the tagged device; and establishing a control session for control of the tagged device using the mobile device, where the distance is within a distance limit specified by the proximity information.

20 Claims, 7 Drawing Sheets

(56) References Cited

U.S. PATENT DOCUMENTS

| | | | | |
|---|---|---|---|---|
| 2014/0178028 | A1* | 6/2014 | Park | H04L 65/1093 |
| | | | | 386/201 |
| 2015/0256926 | A1* | 9/2015 | Kim | H04R 3/12 |
| | | | | 381/77 |
| 2016/0078261 | A1* | 3/2016 | Schütz | H04W 64/00 |
| | | | | 340/10.1 |
| 2016/0258144 | A1* | 9/2016 | Tayenaka | G05D 27/02 |
| 2017/0140596 | A1* | 5/2017 | Retzlaff | F16P 3/08 |
| 2017/0227660 | A1* | 8/2017 | Zhang | H04W 12/50 |
| 2018/0253679 | A1* | 9/2018 | Chritz | G06Q 10/087 |
| 2019/0039570 | A1* | 2/2019 | Foster | B60R 25/252 |
| 2019/0096234 | A1* | 3/2019 | Yoon | H04N 21/42204 |
| 2019/0304216 | A1* | 10/2019 | Mendelson | G06F 1/163 |
| 2020/0137983 | A1* | 5/2020 | Nieveen | A01K 29/005 |
| 2020/0201338 | A1* | 6/2020 | Wang | G07C 9/00182 |
| 2020/0337162 | A1* | 10/2020 | Perkins | G04G 17/04 |
| 2020/0404610 | A1* | 12/2020 | Crouch | G01S 5/0036 |
| 2021/0235246 | A1* | 7/2021 | Hovey | H04W 16/28 |
| 2021/0390811 | A1* | 12/2021 | Learmonth | H04L 63/0442 |
| 2021/0402600 | A1* | 12/2021 | Kim | B25J 13/089 |
| 2022/0221550 | A1* | 7/2022 | Hága et al. | G05D 1/695 |
| 2022/0268875 | A1* | 8/2022 | Szebenyei | G01S 13/74 |
| 2023/0292088 | A1* | 9/2023 | Ten Veldhuis | H04W 8/20 |

OTHER PUBLICATIONS

AMO UWB Module Series Data Sheet, AMO Amosense, AMO UWB Module (SR040 with embedded antenna), Rev 0.9 (ASMOP1CO0A1), Jun. 23, 2021 (20 pages).
Sahinoglu et al., Ranging in the IEEE 802.15.4a Standard, Mitsubishi Electric Research Laboratories, TR2006-097, Dec. 2006 (7 pages).

\* cited by examiner

Time of Flight = $(T_{loop} - T_{loop})/2$

Table 310

| Device | $\Theta_{min}$ | $\Theta_{max}$ | $d_{min}$ | $d_{max}$ |
|---|---|---|---|---|
| 111 | -10 | +10 | 0 | 10 |
| 112 | | | 3 | 6 |
| 116 | -40 | +40 | 0 | 2 |
| ⋮ | ⋮ | ⋮ | ⋮ | ⋮ |

AUTOMATED DEVICE CONTROL SESSION

TECHNICAL FIELD

Subject matter disclosed herein generally relates to technology for computing systems or other systems.

BACKGROUND

An environment can include a number of devices where a control session can be established between two or more of the devices. For example, a home environment can include a number of rooms where at least some of the rooms can include one or more devices.

SUMMARY

A method can include receiving by a mobile device, an identifier transmitted wirelessly from a tagged device; accessing proximity information using the identifier and the mobile device; performing a wireless ranging protocol using the mobile device to determine a distance from the mobile device to the tagged device; and establishing a control session for control of the tagged device using the mobile device, where the distance is within a distance limit specified by the proximity information. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing general principles of various implementations. The scope of invention should be ascertained with reference to issued claims.

Figure 1:
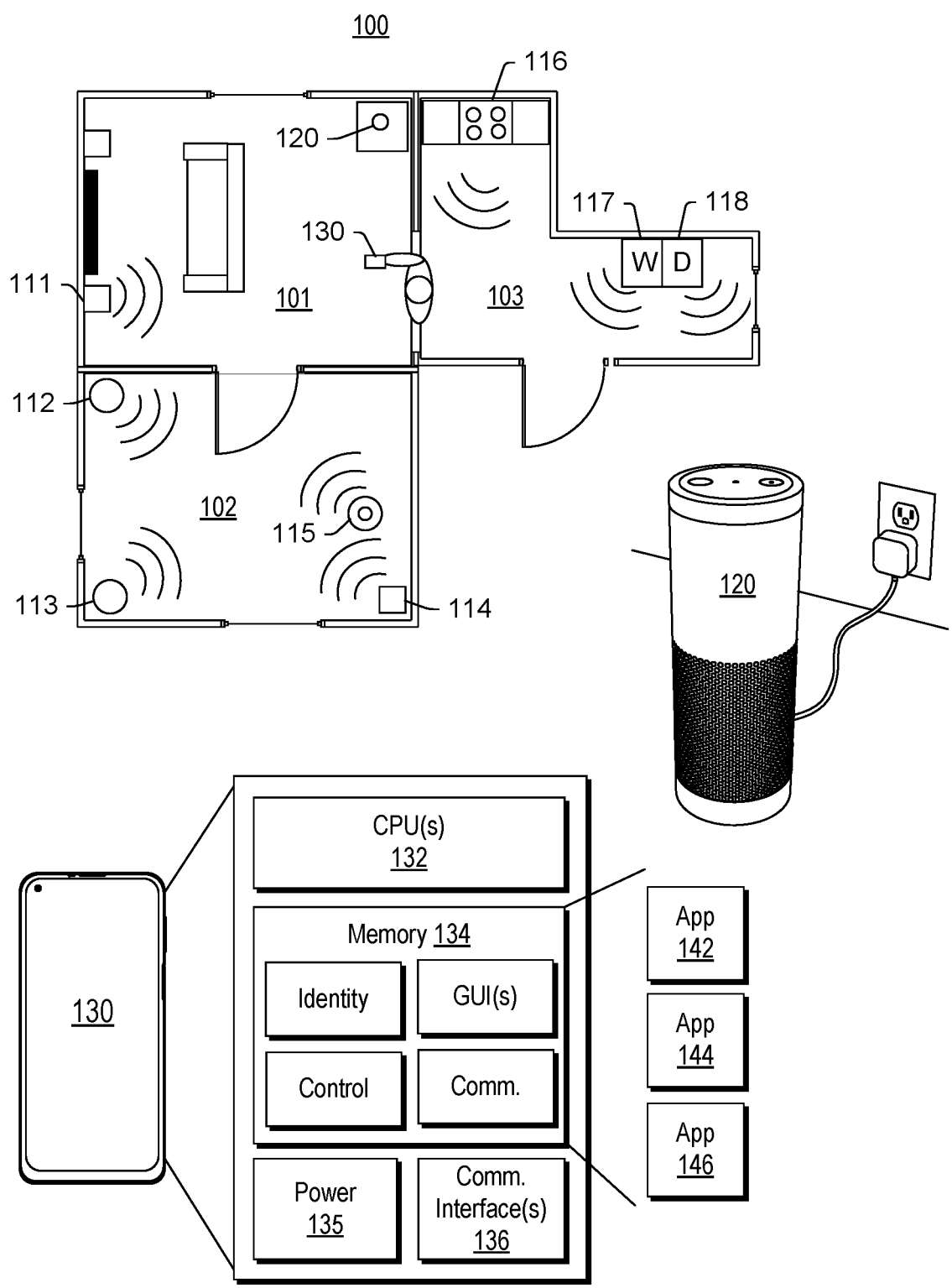
FIG. 1 is a diagram of an example of an environment with various examples of devices.

FIG. 1 shows an example of an environment 100 that includes rooms 101, 102 and 103 where the room 101 includes a device 111, the room 102 includes devices 112, 113, 114 and 115, and the room 103 includes devices 116, 117 and 118. Such devices can include wireless communication circuitry, which may, for example, implement one or more types of wireless communication technologies, techniques, etc. For example, consider BLUETOOTH technology and techniques for communication, which may utilize an ultra-wideband (UWB) standard. UWB is a radio technology that can use a relatively low energy level for short-range, high-bandwidth communications over a large portion of the radio spectrum. Examples of technologies include NXP NCJ29D5, which is HRP and operable in a range of 6 GHz to 8.5 GHz, while NXP SR100T is HRP and operable in a range of 6 GHz to 9 GHz, where HRP is high-rate pulse repetition frequency (PRF) standard (ISO); noting that LRP is a low-rate PRF standard.

Specifically, UWB is a low-energy, high-bandwidth technology that transmits in pulses that has been standardized at the PHY and MAC layers by the ISO and IEEE 802.15. ETSI's TGUWB Task Group has also developed multiple UWB standards for regulatory approval throughout the European Union. The aforementioned LRP and HRP are published by IEEE within the 802.15.4 standard. A document by Sahinoglu et al., Ranging in the IEEE 802.15.4a Standard, Mitsubishi Electric Research Laboratories, TR2006-097, December 2006, is incorporated by reference herein.

According to the IEEE 802.15.4a terminology, RDEV is called the ranging capable device, which implements the optional ranging support, and RFRAME is the ranging frame. The RFRAME is indicated by setting a ranging bit in the PHY header of the IEEE.802.15.4a packet. A range between two RDEVs may be determined via two-way exchange of an RFRAME and tracking its arrival time. Assume that RDEV A wants to perform ranging with RDEV B. The elapsed time between the departure of RFRAME from RDEV A and the reception of the reply RFRAME from RDEV B, Tr, can be approximated as Tr=2Tt+Tta, where Tt is the one-way time of flight of the first arriving signal component and Tta is the turn-around time. The ranging performance depends on how accurately Tt can be estimated.

As shown in the example of FIG. 1, the environment 100 may include a hub device 120, which may be a voice-enabled assistant (VEA) device. The hub device 120 may include circuitry that can wirelessly couple to one or more of the devices 111 to 118, for example, responsive to a voice command. In such an approach, a user may have to be in the same room as the hub device 120, which may complicate the user's ability to establish a control session with particular devices such as the devices 112 to 118 as the hub device 120 is shown as being in the room 101, which only has the device 111. For example, if the user wants to establish a control session with the dryer device 118 in the room 103, the user may have to be in the room 101 for the hub device 120 to be able to receive and suitably convert a voice utterance of the user. To resolve such a situation, the user could carry the hub device 120 from room to room, however, that may be awkward and problematic if the hub device 120 relies on a power cable or a wired network connection. While a battery and wireless network connection may ease an ability to carry the hub device 120 from room to room, the battery, if a backup battery, may be another component to carry and/or the wireless network connection may experience a decrease or drop in signal with a network connection point.

As shown in the example of FIG. 1, a user may carry a mobile device 130 in the environment 100 that can interact with the devices 111 to 118, for example, by establishing a control session with one of the devices 111 to 118. As the environment 100 includes a number of devices, the ability of the mobile device 130 to discern an individual device amongst the number of devices may raise a problem. To address such a problem, the mobile device 130 may render graphics to its display where the user is required to view the graphics representing the different devices and then select the appropriate graphic that corresponds to the device for which the user wants to establish a control session. Such an approach requires the user to look at the display of the mobile device 130 and to interact with the mobile device 130 such as by touching a graphic rendered to the display of the mobile device 130. If the graphics are not sufficiently distinct or large, the user may inadvertently select the wrong device, which may, in turn, require the user to perform further actions.

As shown in the example of FIG. 1, the mobile device 130 can include one or more processors 132, memory 134 accessible to at least one of the one or more processors 132, a power source 135 and a communication interface 136. As shown, the memory 134 can store information for identifying a device, controlling a device, rendering one or more graphical user interfaces (GUIs), communicating with a device and, for example, executing one or more applications 142, 144 and 146, which may be referred to as apps. In such an example, one or more of the devices 111 to 118 may be controllable via one or more of the apps 142, 144 and 146.

As explained, to establish a control session with one of the devices 111 to 118, the mobile device 130 may require a user to select a graphic (e.g., from a list, etc.) rendered to a display of the mobile device 130. As an example, a user may have to select a graphic that corresponds to one of the apps 142, 144 and 146 for purposes of control of one or more of the devices 111 to 118. In such an example, where the one of the apps 142, 144 and 146 can control more than one of the devices 111 to 118, the user may have to select a particular device from a list of controllable devices. In various scenarios, a user is required to make a selection when the user desires to establish a control session between the mobile device 130 and one or more of the devices 111 to 118.

As mentioned, the devices 111 to 118 and, for example, the mobile device 130 as shown in the example environment 100 of FIG. 1 may utilize UWB technologies and techniques. In such an approach, the mobile device 130 may be able to locate each of the devices 111 to 118. For example, the mobile device 130 may be able to execute an app that provides for locating the device 111 in the room 101. In such an example, the app may render information to the display of the mobile device 130 that indicates distance and angle to the device 111. Such an approach can be utilized with so-called tag devices, which may be referred to as tags. For example, a user may attach a tag to her purse and then use the app executing on the mobile device 130 to locate her purse by decreasing the distance and following an indicated angle. In the example environment 100 of FIG. 1, however, various devices can be fixed such that there is no sense of one of those devices getting lost. In FIG. 1, the device 115 may be a robot device, which may, for example, run out of battery power and die before it makes it back to a docking station. Such a device may, in a sense, be capable of getting lost, however, it may be readily located if it remains on the floor of a room (e.g., consider a robotic vacuum or floor mop).

As an example, a method can utilize various features of UWB for a purpose other than finding a lost item. For example, a method can include automatically establishing a control session with a device based on information such as distance and/or angle.

Figure 2:
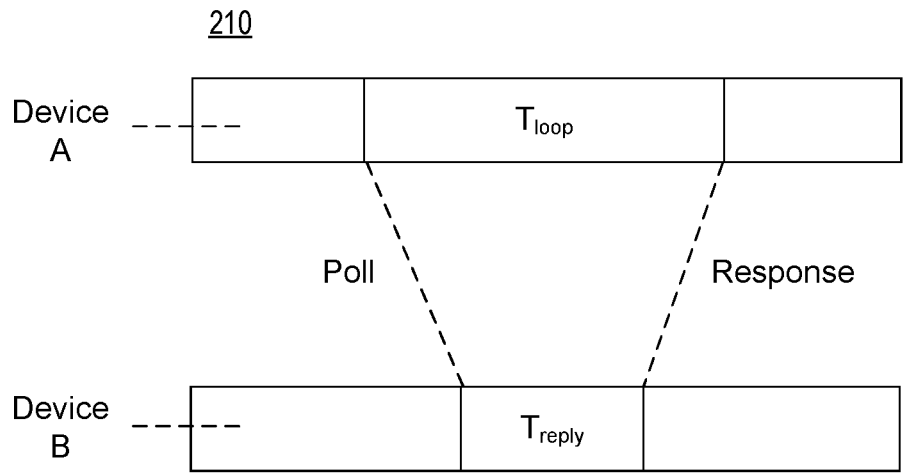
FIG. 2 is a series of diagrams of examples of distance and angle determinations.
Figure 2:
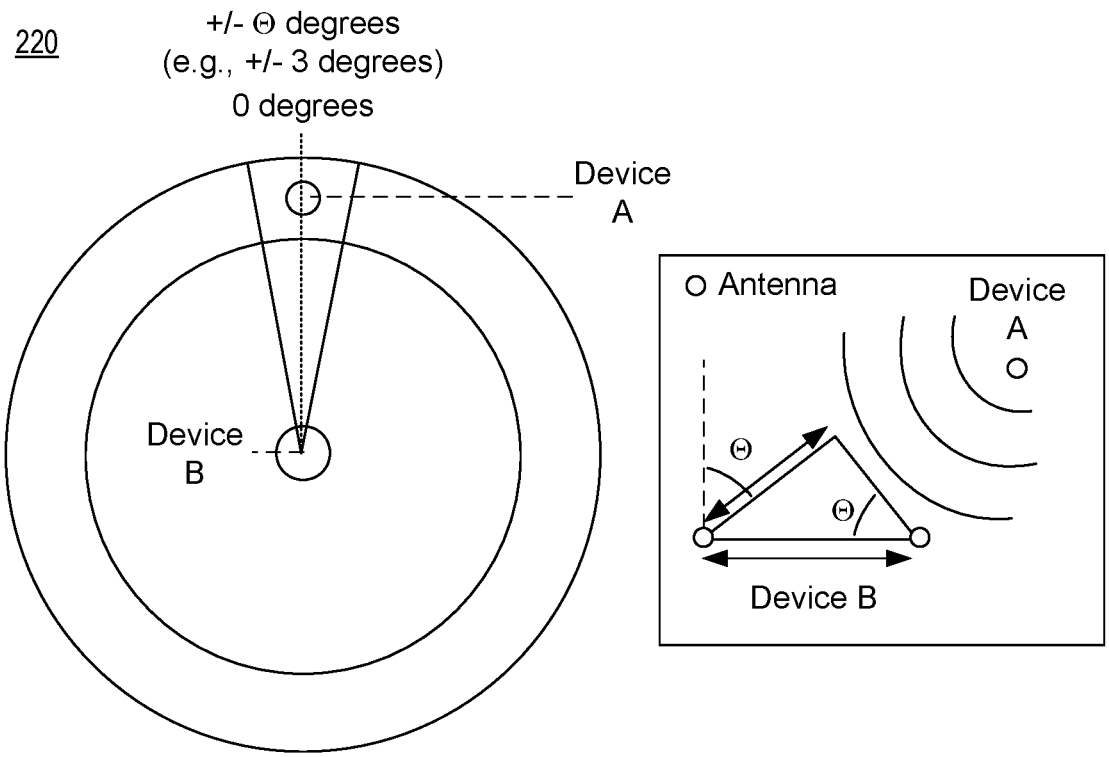

FIG. 2 shows diagrams 210 and 220 of example techniques that can be utilized to determine a distance and an angle between two devices, denoted device A and device B. As shown in the diagrams 210 and 220 device B may be a mobile device that aims to seek out device A. In the diagram 210, a time of flight (TOF) approach is shown where time of flight can be related to a distance between the devices A and B. In the diagram 220, an angle of arrival (AOA) approach is shown where an angle of arrival of a signal transmitted from device A to device B may be discerned with accuracy within, for example, plus or minus 3 degrees.

As to angle of arrival (AOA) techniques, using impulse radio UWB (IR-UWB), one or more of various schemes can be used to calculate AOA from an IR-UWB source (tag) transmitting to two IR-UWB receivers (anchor). For example, consider a TOF scheme where a delta between two measured TOF values is used to estimate an angle. TOFs may be estimated by two separate two-way ranging procedures. As another example, consider a time difference of arrival (TDOA) scheme where a delta between received timestamps of the same frame is used to estimate an angle. Yet another example can be phase difference of arrival (PDOA) where a delta between phases of the received carrier is used to estimate an angle for the same frame. Further, consider a TDOA/PDOA hybrid scheme where, for distances between antennae above half-wavelength, TDOA is used to select one of pre-defined AOA intervals and PDOA is used to get the AOA estimate within the selected interval. Of such schemes, PDOA provides relatively high accuracy of an angle estimate; noting that a hybrid or hybrids may be utilized.

As to the PDOA scheme, consider a radio signal sent from a distant transmitter of device A (e.g., transmitter antenna) which arrives at two antennas of device B where a difference in path length is related to the distance between the two antennas of device B and the AOA with respect to the radio signal transmitted by device A. In such an example, UWB receivers of device B (e.g., an antenna array) are capable of path separation due to the large bandwidth of the UWB pulse (its short duration). Hence PDOA of a first path can be precisely measured by using a coherent UWB radio. An article by Dotlic et al., Angle of Arrival Estimation Using Decawave DW1000 Integrated Circuits, IEEE Xplore: 11 Jan. 2018, IEEE 2017 14th Workshop on Positioning, Navigation and Communications (WPNC), Date of Conference: 25-26 Oct. 2017, is incorporated herein by reference.

As to a tag, it can be a transmitter only tag; whereas, a device can be a transmitter and receiver. As to a mobile device that is utilized to determine position, it can include multiple antennas such as two or more antennas that can be arranged or provided as an array (e.g., a so-called antenna array).

As an example, a tag or a device can include circuitry that supports UWB (e.g., 6.24 GHz to 8.24 GHz, etc.) and can include a programmable transmitter output power of up to +12 dBm, data rates of 110 kbps, 850 kbps, 6.8 Mbps, 7.8 Mbps, support for 2-way ranging, a configurable current limiter for applications with coin cell battery supply, an ARM CORTEX-M33 32-bit processor, an SPI Interface, features operable using a supply voltage 1.8 V to 3.6 V, a module and shield CAN size of 13 mm×18 mm×2.7 mm, a reference clock of 55.2 MHz, etc. Such circuitry may be suitable for various IoT applications, as a UWB tracker, and as a UWB tags. A document AMO UWB Module Series Data Sheet, AMO AMOSENSE, AMO UWB Module (SR040 with embedded antenna), Rev 0.9 (ASMOP1CO0A1), Jun. 23, 2021, is incorporated herein by reference.

As an example, circuitry can provide for determining a distance to a device where the distance is within an accuracy of approximately 10 cm. For example, consider determining a distance of a device that is approximately 10 cm away from a mobile device or determining a distance of a device that is at a distance of 1 m plus or minus 5 cm (e.g., from 95 cm to 115 cm). As an example, circuitry can provide for determining an angle with respect to a device where the angle is within an accuracy of approximately 3 degrees (e.g., plus or minus 3 degrees).

Figure 3:
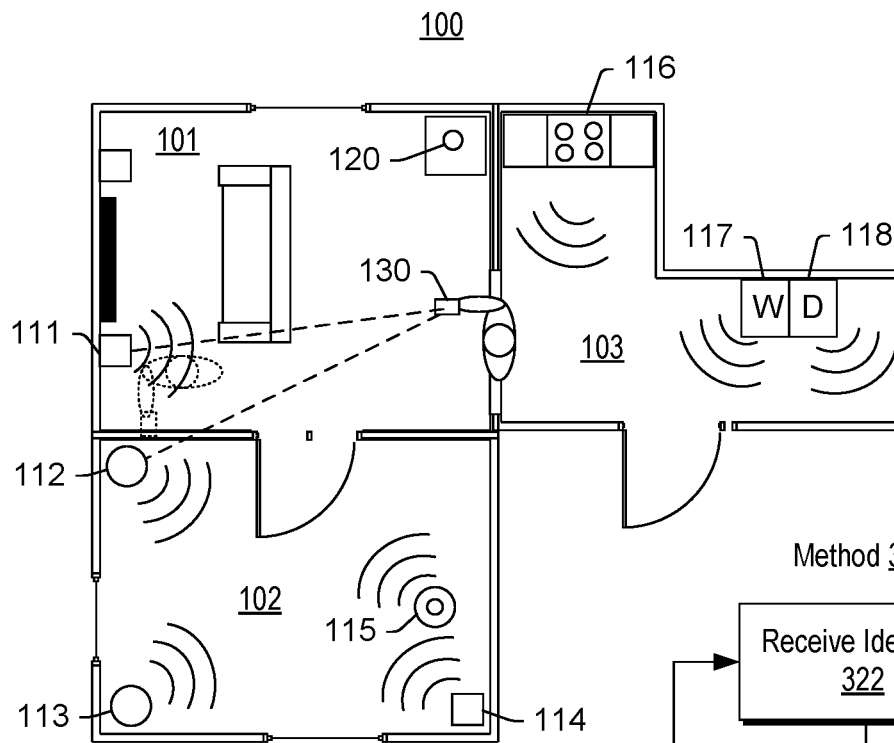
FIG. 3 is a series of diagrams of an example scenario, an example of a table of settings, and an example of a method.
Figure 3:
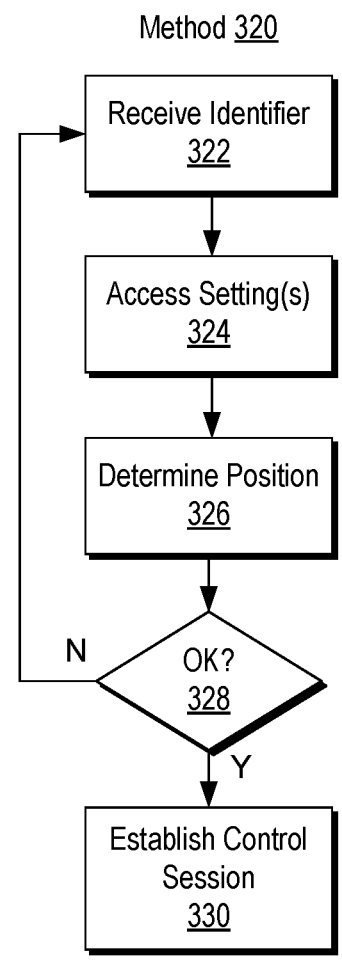

FIG. 3 shows an example scenario in the environment 100 where a user is carrying the mobile device 130 with intent to establish a control session with the device 111, noting that the device 112 is relatively close, yet separated by a wall. As shown via a dotted representation of the user, it is unlikely that the user would face the wall and try to establish a control session with the device 112 while in the room 101. Hence, various angles (e.g., a range or ranges of angles) may be defined for the device 111 and/or the device 112. Further, a distance or distances (e.g., a range or ranges of distances) may be defined for the device 111 and/or the device 112. As an example, the mobile device 130 may automatically establish a control session with a device in an environment with multiple devices using one or more types of information, which can include one or more distances and/or one or more angles.

As shown in FIG. 3, physical structures of the environment 100 such as rooms, walls, doors, etc., can physically limit and/or logically limit distance and/or angle, which may infer intent as to which device for which a user wants to establish a control session. Such information about an environment can facilitate automatic establishment optionally without a user having to even look at a mobile device. However, a user may be required to hold a mobile device in a certain orientation where, for example, angle of arrival is utilized. For example, an angle determined with a smartphone in a user's pocket can be different than an angle determined with a smartphone in a user's hand as shown in the example of FIG. 3.

In the example of FIG. 3, a table 310 is shown with examples of some settings and entries for some of the settings. As shown, a device can include one or more of an angle, angles, a distance and distances. FIG. 3 also shows an example of a method 320 that includes a reception block 322 for receiving by a mobile device, an identifier transmitted wirelessly from a tagged device; an access block 324 for accessing proximity information using the identifier and the mobile device; a determination block 326 for performing a wireless ranging protocol using the mobile device to determine a distance from the mobile device to the tagged device; a decision block 328 for deciding whether the distance compares favorably with the proximity information; and an establishment block 330 for establishing a control session for control of the tagged device using the mobile device, for example, where the distance is within a distance limit specified by the proximity information. As explained, such an approach can also include assessing angle such as AOA with respect to one or more angle limits.

Figure 4:
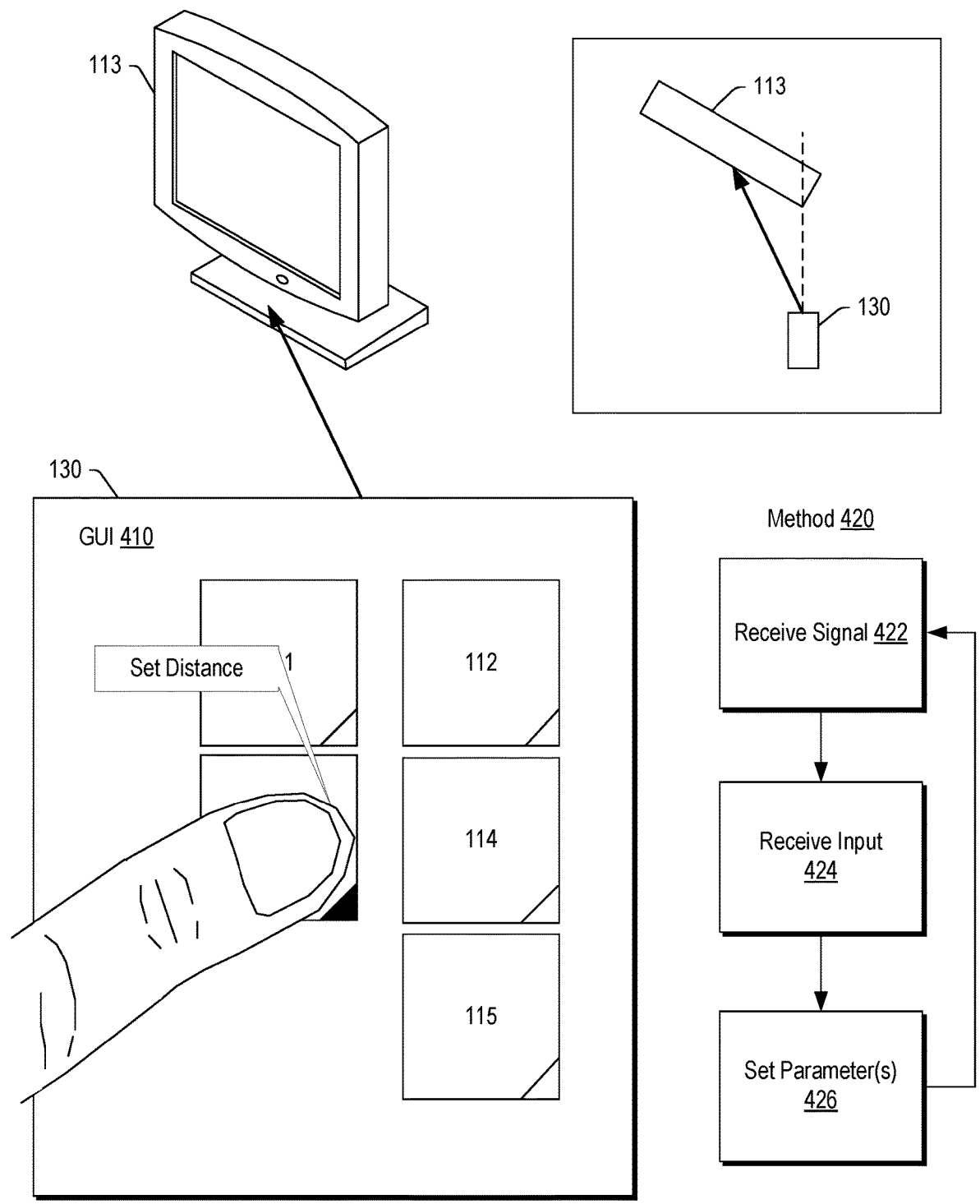
FIG. 4 is a series of diagrams of an example of a graphical user interface and an example of a method.

FIG. 4 shows an example of a GUI 410 that may be rendered to a display of the mobile device 130 where graphics can represent devices such as, for example, the devices 111, 112, 113, 114, 115, etc., which can be devices of an environment such as a home, an apartment, etc. In the example of FIG. 4, a user selects the graphic for the device 113 when the user is a distance away from the device 113, which can act to set the distance, for example, as a minimum distance, a maximum distance, a distance with plus and/or minus limits, etc. As an example, such an approach may also set an angle. In such an approach, a user can cause an application of the mobile device 130 to populate entries of a table or other data structures (see, e.g., the table 310 of FIG. 3). As an example, a user may quickly cause the mobile device 130 to determine settings for devices such that the settings may be utilized in the future to automatically establish a control session with one of the devices.

FIG. 4 also shows an example of a method 420 that includes a reception block 422 for receiving a signal by a mobile device, a reception block 424 for receiving input via the mobile device and a set block 426 for setting one or more parameters for a device where the mobile device can establish a control session with the device.

Figure 5:
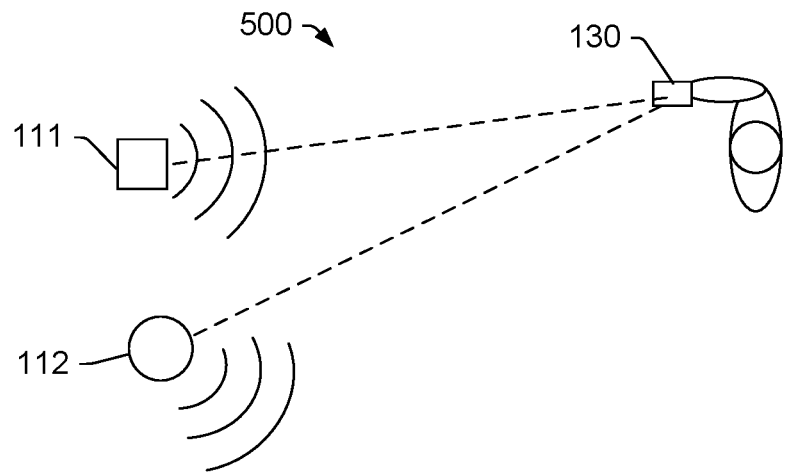
FIG. 5 is a series of diagrams of an example of a scenario and example of a method.
Figure 5:
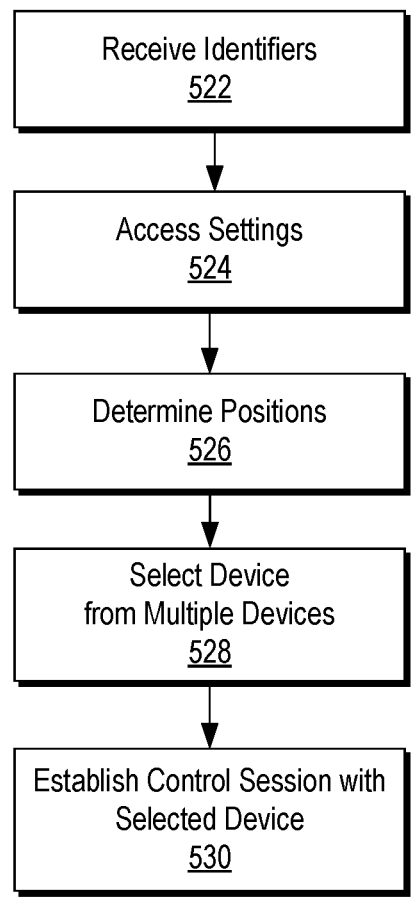

FIG. 5 shows an example of a scenario 500 that includes the devices 111 and 112 and the user with the mobile device 130 and an example of a method 520. In the example of FIG. 5, the method 520 can include a reception block 522 for receiving identifiers from the devices 111 and 112; an access block 524 for accessing settings for the devices 111 and 112 using the identifiers; a determination block 526 for performing a wireless ranging protocol using the mobile device 130 to determine a distance from the mobile device 130 to the device 111 and to determine a distance from the mobile device 130 to the device 112; a selection device 528 for selecting one of the devices 111 and 112 based at least in part on one or more of the distances and the settings; and an establishment block 530 for establishing a control session with the selected one of the devices 111 and 112.

As an example, a method can include making a determination that one of the distances is not within a distance limit specified by proximity information; and responsive to the determination, temporarily halting processing of the mobile device 130 associated with one of the devices 111 and 112 during an established control session for control of the other one of the devices 111 and 112.

As explained, a method can include establishing a control session with a device using a mobile device without a user having to look at a display of the mobile device and, for example, without having the mobile device activate its display and/or render a graphical user interface (GUI) to its display. As an example, a mobile device may render a sound via a speaker to indicate that a control session has been established.

As an example, once a control session has been established, a mobile device may activate an app that may be suitable for control of a device via an established control session. For example, in the method 520 of FIG. 5, an activation block may be included that activates an app of a mobile device once the establishment block 530 establishes the control session with the selected device. For example, consider a wireless speaker as a device where a mobile device can include a media application that may be automatically activated responsive to establishment of a control session with the wireless speaker. While a wireless speaker is mentioned as an example of a device, a device may be a television, a robot, an appliance, a light, an HVAC controller (e.g., a thermostat, etc.), a camera (e.g., a security camera, etc.), a hub device (e.g., a VEA, etc.), etc.

Figure 6:
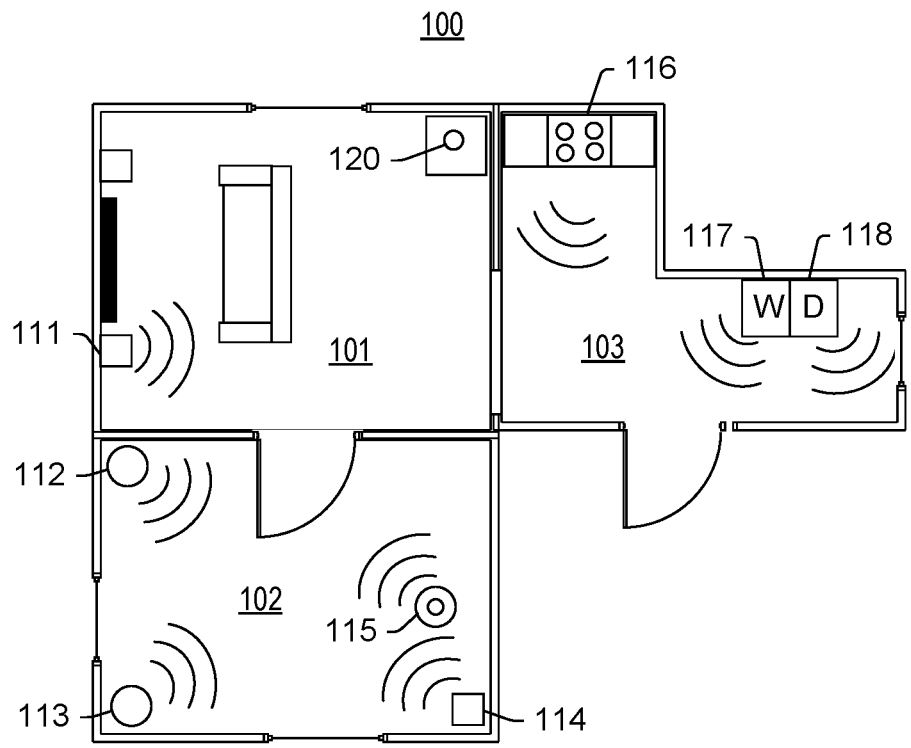
FIG. 6 is a series of diagrams of an example of an environment and an example of a method.
Figure 6:
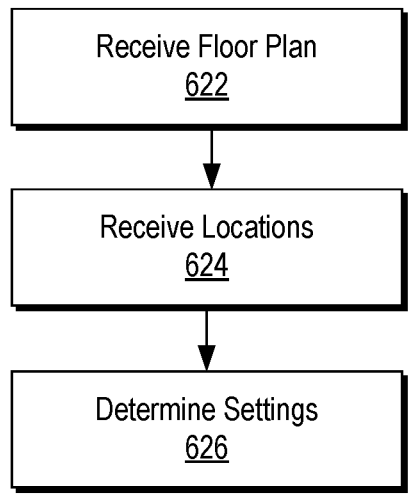

FIG. 6 shows an example of a method 620 with respect to the example environment 100. As shown, the method 620 can include a reception block 622 for receiving a floor plan, a reception block 624 for receiving locations of devices, and a determination block 626 for determining settings. Such a method can provide for populating a table or data structure as to one or more proximity settings, which can include one or more distances and one or more angles.

In the example of FIG. 6, the method 620 can automatically determine suitable settings for various devices in an environment such that a user may not have to enter or otherwise determine such settings. In such an example, the method 620 can include performing various simulations of an individual (e.g., a user) moving in the environment according to the floor plan and the locations of the devices. Such a simulation may account for furniture and/or other objects within an environment. For example, a chair, a desk, a sofa, a media center, etc., may be utilized to understand how an individual may navigate an environment. As an example, a simulation may utilize a Monte Carlo technique that generates various movement scenarios for utilization of the various devices. Such a simulation may determine likely or probable paths of an individual from a doorway of a room to a sofa where the individual may want to utilize one or more devices in the room. Once various navigation paths are determined, they may be assessed to make paths with respect to devices are sufficiently distinct.

As an example, a method may include utilizing machine learning (ML) and one or more machine learning models to determine settings. For example, consider collecting data as to human behavior, whether via UWB, one or more cameras, interactions with devices, etc. In such an example, the data can be utilized to train one or more machine learning models to provide for appropriate settings for automatic establishment of a control setting with one or more devices in an environment. As an example, a ML approach may utilize spatial data and/or temporal data. For example, it may be unlikely that an individual will want to utilize a wireless speaker of a high end and powerful sound system at 3:00 AM; whereas, that individual may want to utilize a security camera, a night light, etc., at 3:00 AM. Hence, settings can include time of day or other temporal information.

As an example, an environment can include multiple individuals with multiple mobile devices that may establish control sessions with devices. As an example, logic can account for presence of other mobile devices that may be associated with other users. For example, a child's mobile device may be able to establish a control session with a particular device only when a mobile device of a parent is present and, for example, within proximity of settings (e.g., to indicate a proximity of the parent's mobile device to the child's mobile device). As an example, logic can include if then statements such as, for example, only establish a control session with a device if two mobile devices are present where a relationship or hierarchy may exist with respect to the two mobile devices (e.g., parent and child, etc.).

As explained, various approaches can streamline connections between of a group of smart devices being used in a large, multi-room space. Such a group can include a mix of screen-based (phone, laptop, tablet, smart watch, etc.) and non-screen-based (speaker, headphones, camera, etc.) smart devices. As explained, a method may be screen-less in that a control session can be established without use of a screen, which may be particularly useful for devices that do not includes a screen.

As explained, a method can provide for seamless connection moving around a large space, especially between rooms and floors. For example, consider a user moving through her house with BLUETOOTH headphones on, encountering a TV in the living room, a smart display in the kitchen, and a tablet in the study. Rather than having to manually switch between devices as the user moves from room to room, or waiting until a signal is lost and reconnect with the nearest device, a method can include establishing a control session based on one or more settings.

As an example, a method can be dynamic for connecting a group of smart devices. As an example, a user may configure settings and/or logic of group connections based on proximity between devices, for example, using an advanced form of geofencing for when to connect and disconnect from each device. As explained, such logic can be tuned as the user's needs or devices change, whether manually and/or automatically.

As an example, a system can allow a user to wear BLUETOOTH headphones in a study and watch a video on their tablet. If that user gets up and moves into the kitchen, and has a set-up a proximity auto-switch for the tablet to 10 feet, and the smart display in the kitchen to 20 feet, then as the user walks away from the tablet and towards the kitchen, the headphones can automatically switch between the devices.

As an example, proximity-based device group logic can allow for user experiences like moving a wireless speaker into a room with another wireless speaker, and setting up stereo audio based on proximity. In such an example, if audio is playing from both speakers, the user can set up parameters for which speaker should take over audio from the other (for example, the stationary one takes over the mobile one).

As explained, groups of smart devices can include wireless connection capabilities that allow for transmission of audio and/or visual data and for determination as to proximity between them. As explained, devices may be configure to automatically connect and disconnect from each other based on preset logic, preset settings, etc., that can pertain to spatial and/or temporal information.

As explained, an application or app may be activated responsive to a determination that a particular device is to be connected with a mobile device where, for example, an application controlled on one or more of the devices can allow a user to set up initial connections between the smart devices, allows them to configure proximity logic, preferences, etc.

As an example, a method can include receiving by a mobile device, an identifier transmitted wirelessly from a tagged device; accessing proximity information using the identifier and the mobile device; performing a wireless ranging protocol using the mobile device to determine a distance from the mobile device to the tagged device; and establishing a control session for control of the tagged device using the mobile device, where the distance is within a distance limit specified by the proximity information. In such an example, the identifier can be a first identifier, the tagged device can be a first tagged device, the proximity information can be first proximity information, the distance can be a first distance, and the distance limit can be a first distance limit, where the method further includes receiving by the mobile device, a second identifier transmitted wirelessly from a second tagged device; accessing second proximity information using the second identifier and the mobile device; performing the wireless ranging protocol using the mobile device to determine a second distance from the mobile device to the tagged device; making a determination that the second distance is not within a second distance limit specified by the second proximity information; and responsive to the determination, temporarily halting processing of the mobile device associated with the second tagged device during the established control session for control of the first tagged device.

As an example, a method can include generating proximity information responsive to receipt of a command by a mobile device where a tagged device and the mobile device are separated by a distance limit.

As an example, a distance limit can be a maximum distance limit and/or a minimum distance limit. Where a distance limit is both a minimum and a maximum, it may be a specific distance (e.g., an exact distance).

As an example, proximity information can specify one or more of a minimum distance limit, a maximum distance limit, an angle and a range of angles. As an example, proximity information can specify at least one distance limit and at least one angle. As an example, a range of angles can correspond to a position of a tagged device in a room that includes walls and an entryway. For example, an individual may enter via the entryway (e.g., a doorway) and be physically bound by the walls such that movements of the individual are limited. In such an example, if a tagged device is in a corner with a right angle (90 degrees), then then angles of approach of the individual may be limited to less than 360 degrees. Hence, position of a tagged device with respect to walls (e.g., and where walls meet) can be utilized in setting a range of angles. Further, as an individual is confined to entering and leaving through an entryway (e.g., and exitway), the approach of the individual toward the tagged device can also be probabilistically likely from a certain angle (e.g., plus or minus some amount of error).

As an example, a media room can include a media center with a television where entry into the media room is likely to be for use of the television. In such an example, a single step into the media room may not be within a maximum distance yet several steps in may be, as that can indicate an intention that the media room is to be utilized rather than a quick step in for some other purpose. As an angle or range of angles between an entryway to the media room and the television may be know and fixed, one or more angle criteria may be utilized additionally or alternatively to one or more distance criteria. Such an approach can facilitate establishing a control session with the television in the media room.

As an example, a wireless ranging protocol can utilize time of flight of wireless signals to determine a distance and/or a wireless ranging protocol can utilize an angle of arrival technique of wireless signals to determine an angle between a mobile device direction and a tagged device direction. As an example, an angle of arrival technique can utilize one or more of time of flight, time difference of arrival and phase difference of arrival of wireless signals.

As an example, a mobile device can include memory that stores proximity information in association with at least an identifier. As an example, a mobile device can include memory that stores proximity information for a plurality of different tagged devices, where each of the different tagged devices has a corresponding identifier.

As an example, a mobile device can include memory that stores positional information for a tagged device where, for example, the positional information indicates that the tagged device is stationary or not stationary (e.g., consider an appliance or media center that may be stationary and a vacuum that may be mobile and hence not stationary).

As an example, a method can include, responsive to a change in a distance such that a changed distance is not within a distance limit specified by proximity information, terminating an established control session.

As an example, a method can include, responsive to a change in an angle between a direction of a mobile device and a direction of a tagged device, terminating an established control session. In such an example, terminating can be based on a comparison of the angle to an angle specified by proximity information.

As an example, a tagged device and a mobile device can include ultra-wideband circuitry.

As an example, a computer program product can include instructions to instruct a computing device, a computing system, etc., to perform one or more methods.

The term "circuit" or "circuitry" is used in the summary, description, and/or claims. As is well known in the art, the term "circuitry" includes all levels of available integration (e.g., from discrete logic circuits to the highest level of circuit integration such as VLSI, and includes programmable logic components programmed to perform the functions of an embodiment as well as general-purpose or special-purpose processors programmed with instructions to perform those functions) that includes at least one physical component such as at least one piece of hardware. A processor can be circuitry. Memory can be circuitry. Circuitry may be processor-based, processor accessible, operatively coupled to a processor, etc. Circuitry may optionally rely on one or more computer-readable media that includes computer-executable instructions. As described herein, a computer-readable medium may be a storage device (e.g., a memory chip, a memory card, a storage disk, etc.) and referred to as a computer-readable storage medium, which is non-transitory and not a signal or a carrier wave.

Figure 7:
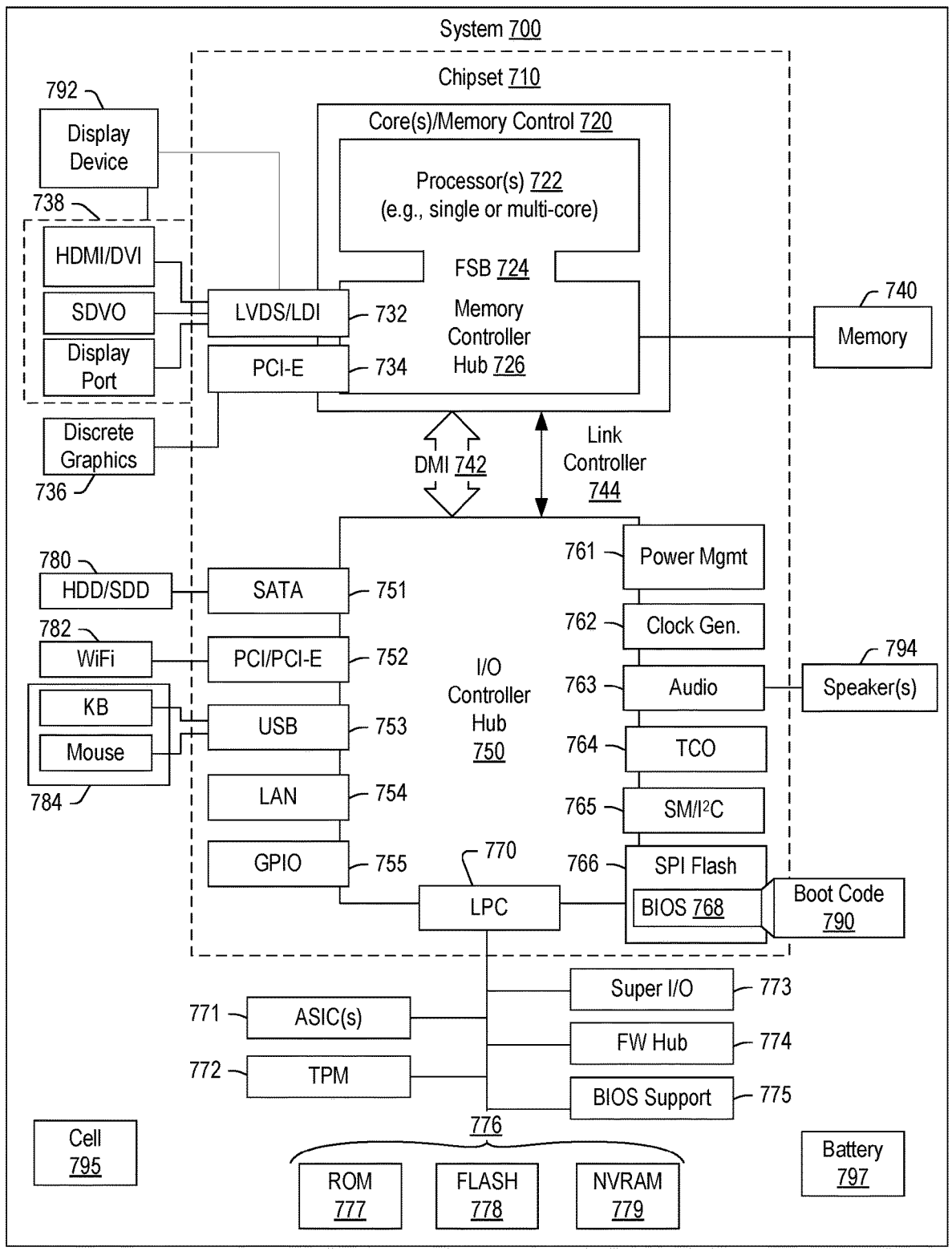
FIG. 7 is a diagram of an example of a system that includes one or more processors.

While various examples of circuits or circuitry have been discussed, FIG. 7 depicts a block diagram of an illustrative computer system 700. The system 700 may be a computer system, such as one of the ThinkCentre® or ThinkPad® series of personal computers sold by Lenovo (US) Inc. of Morrisville, NC, or a workstation computer system, such as the ThinkStation®, which are sold by Lenovo (US) Inc. of Morrisville, NC; however, as apparent from the description herein, a system or other machine may include other features or only some of the features of the system 700. As an example, one or more of the devices in FIG. 1 may include one or more of the features of the system 700 of FIG. 7.

As shown in FIG. 7, the system 700 includes a so-called chipset 710. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 7, the chipset 710 has a particular architecture, which may vary to some extent depending on brand or manufacturer. The architecture of the chipset 710 includes a core and memory control group 720 and an I/O controller hub 750 that exchange information (e.g., data, signals, commands, etc.) via, for example, a direct management interface or direct media interface (DMI) 742 or a link controller 744. In the example of FIG. 7, the DMI 742 is a chip-to-chip interface (sometimes referred to as being a link between a "northbridge" and a "southbridge").

The core and memory control group 720 include one or more processors 722 (e.g., single core or multi-core) and a memory controller hub 726 that exchange information via a front side bus (FSB) 724. As described herein, various components of the core and memory control group 720 may be integrated onto a single processor die, for example, to make a chip that supplants the conventional "northbridge" style architecture.

The memory controller hub 726 interfaces with memory 740. For example, the memory controller hub 726 may provide support for DDR SDRAM memory (e.g., DDR, DDR2, DDR3, etc.). In general, the memory 740 is a type of random-access memory (RAM). It is often referred to as "system memory".

The memory controller hub 726 further includes a low-voltage differential signaling interface (LVDS) 732. The LVDS 732 may be a so-called LVDS Display Interface (LDI) for support of a display device 792 (e.g., a CRT, a flat panel, a projector, etc.). A block 738 includes some examples of technologies that may be supported via the LVDS interface 732 (e.g., serial digital video, HDMI/DVI, display port). The memory controller hub 726 also includes one or more PCI-express interfaces (PCI-E) 734, for example, for support of discrete graphics 736. Discrete graphics using a PCI-E interface has become an alternative approach to an accelerated graphics port (AGP). For example, the memory controller hub 726 may include a 16-lane (×16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 750 includes a variety of interfaces. The example of FIG. 7 includes a SATA interface 751, one or more PCI-E interfaces 752 (optionally one or more legacy PCI interfaces), one or more USB interfaces 753, a LAN interface 754 (more generally a network interface), a general purpose I/O interface (GPIO) 755, a low-pin count (LPC) interface 770, a power management interface 761, a clock generator interface 762, an audio interface 763 (e.g., for speakers 794), a total cost of operation (TCO) interface 764, a system management bus interface (e.g., a multi-master serial computer bus interface) 765, and a serial peripheral flash memory/controller interface (SPI Flash) 766, which, in the example of FIG. 7, includes BIOS 768 and boot code 790. With respect to network connections, the I/O hub controller 750 may include integrated gigabit Ethernet controller lines multiplexed with a PCI-E interface port. Other network features may operate independent of a PCI-E interface.

The interfaces of the I/O hub controller 750 provide for communication with various devices, networks, etc. For example, the SATA interface 751 provides for reading, writing or reading and writing information on one or more drives 780 such as HDDs, SDDs or a combination thereof. The I/O hub controller 750 may also include an advanced host controller interface (AHCI) to support one or more drives 780. The PCI-E interface 752 allows for wireless connections 782 to devices, networks, etc. The USB interface 753 provides for input devices 784 such as keyboards (KB), one or more optical sensors, mice and various other devices (e.g., microphones, cameras, phones, storage, media players, etc.). On or more other types of sensors may optionally rely on the USB interface 753 or another interface (e.g., $I^2C$, etc.). As to microphones, the system 700 of FIG. 7 may include hardware (e.g., audio card) appropriately configured for receipt of sound (e.g., user voice, ambient sound, etc.).

In the example of FIG. 7, the LPC interface 770 provides for use of one or more ASICs 771, a trusted platform module (TPM) 772, a super I/O 773, a firmware hub 774, BIOS support 775 as well as various types of memory 776 such as ROM 777, Flash 778, and non-volatile RAM (NVRAM) 779. With respect to the TPM 772, this module may be in the form of a chip that can be used to authenticate software and hardware devices. For example, a TPM may be capable of performing platform authentication and may be used to verify that a system seeking access is the expected system.

The system 700, upon power on, may be configured to execute boot code 790 for the BIOS 768, as stored within the SPI Flash 766, and thereafter processes data under the control of one or more operating systems and application software (e.g., stored in system memory 740). An operating system may be stored in any of a variety of locations and accessed, for example, according to instructions of the BIOS 768. Again, as described herein, a satellite, a base, a server or other machine may include fewer or more features than shown in the system 700 of FIG. 7. Further, the system 700 of FIG. 7 is shown as optionally include cell phone circuitry 795, which may include GSM, CDMA, etc., types of circuitry configured for coordinated operation with one or more of the other features of the system 700. Also shown in FIG. 7 is battery circuitry 797, which may provide one or more battery, power, etc., associated features (e.g., optionally to instruct one or more other components of the system 700). As an example, a SMBus may be operable via a LPC (see, e.g., the LPC interface 770), via an $I^2C$ interface (see, e.g., the $SM/I^2C$ interface 765), etc.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A method comprising:
  receiving by a mobile device, a first identifier transmitted wirelessly from a first tagged device;
  accessing first proximity information using the first identifier and the mobile device;
  performing a wireless ranging protocol using the mobile device to determine a first distance from the mobile device to the first tagged device;
  establishing a control session for control of the first tagged device using the mobile device, wherein the first distance is within a first distance limit specified by the first proximity information;
  receiving by the mobile device, a second identifier transmitted wirelessly from a second tagged device;
  accessing second proximity information using the second identifier and the mobile device;
  performing the wireless ranging protocol using the mobile device to determine a second distance from the mobile device to the second tagged device;
  making a determination that the second distance is not within a second distance limit specified by the second proximity information; and
  responsive to the determination, temporarily halting processing of the mobile device associated with the second tagged device during the established control session for control of the first tagged device.

2. The method of claim 1, comprising generating the first proximity information responsive to receipt of a command by the mobile device wherein the first tagged device and the mobile device are separated by the first distance limit.

3. The method of claim 1, wherein the first distance limit is a maximum distance limit.

4. The method of claim 3, wherein the first proximity information specifies a minimum distance limit.

5. The method of claim 1, wherein the first proximity information specifies an angle.

6. The method of claim 1, wherein the first proximity information specifies a range of angles.

7. The method of claim 1, wherein the first proximity information specifies at least the first distance limit and at least one angle.

8. The method of claim 1, wherein the wireless ranging protocol utilizes time of flight of wireless signals to determine at least the first distance.

9. The method of claim 1, wherein the wireless ranging protocol utilizes an angle of arrival technique of wireless signals to determine an angle between a mobile device direction and a tagged device direction.

10. The method of claim 9, wherein the angle of arrival technique utilizes one or more of time of flight, time difference of arrival and phase difference of arrival of the wireless signals.

11. The method of claim 1, wherein the mobile device comprises memory that stores the first proximity information in association with at least the first identifier.

12. The method of claim 1, wherein the mobile device comprises memory that stores proximity information for a plurality of additional, different tagged devices, wherein each of the additional, different tagged devices comprises a corresponding identifier.

13. The method of claim 1, wherein the mobile device comprises memory that stores positional information for the first tagged device.

14. The method of claim 13, wherein the positional information indicates that the first tagged device is stationary or not stationary.

15. The method of claim 1, comprising, responsive to a change in the first distance such that a changed distance is not within the first distance limit specified by the first proximity information, terminating the established control session.

16. The method of claim 1, comprising, responsive to a change in an angle between a direction of the mobile device and a direction of the first tagged device, terminating the established control session.

17. The method of claim 16, wherein the terminating is based on a comparison of the angle to an angle specified by the first proximity information.

18. The method of claim 1, wherein at least the first tagged device and the mobile device comprise ultra-wideband circuitry.

19. A mobile device comprising:
a processor;
memory accessible to the processor;
computer-executable instructions stored in the memory, executable by the processor to instruct the mobile device to:
receive a first identifier transmitted wirelessly from a first tagged device;
access first proximity information using the first identifier;
perform a wireless ranging protocol to determine a first distance from the mobile device to the first tagged device;
establish a control session for control of the first tagged device, wherein the first distance is within a first distance limit specified by the first proximity information;
receive a second identifier transmitted wirelessly from a second tagged device;
access second proximity information using the second identifier;
perform the wireless ranging protocol to determine a second distance from the mobile device to the second tagged device;
make a determination that the second distance is not within a second distance limit specified by the second proximity information; and
responsive to the determination, temporarily halt processing of the mobile device associated with the second tagged device during the established control session for control of the first tagged device.

20. One or more non-transitory computer-readable storage media that comprise computer-executable instructions executable by a processor of a mobile device to instruct the mobile device to:
receive a first identifier transmitted wirelessly from a first tagged device;
access first proximity information using the first identifier;
perform a wireless ranging protocol to determine a first distance from the mobile device to the first tagged device;
establish a control session for control of the first tagged device, wherein the first distance is within a first distance limit specified by the first proximity information;
receive a second identifier transmitted wirelessly from a second tagged device;
access second proximity information using the second identifier;
perform the wireless ranging protocol to determine a second distance from the mobile device to the second tagged device;
make a determination that the second distance is not within a second distance limit specified by the second proximity information; and
responsive to the determination, temporarily halt processing of the mobile device associated with the second tagged device during the established control session for control of the first tagged device.

* * * * *